United States Patent [19]
Gauvin

[11] Patent Number: 5,632,350
[45] Date of Patent: May 27, 1997

[54] ARTICULATED VEHICLE

[76] Inventor: Donald Gauvin, 247 rue du Pecheur, C. P. 388, Lameque, N. B., Canada, E0B 1V0

[21] Appl. No.: 523,557

[22] Filed: Sep. 5, 1995

[51] Int. Cl.⁶ .................................. B60D 1/01; B62D 11/20
[52] U.S. Cl. ........................ 180/9.44; 180/14.4; 180/418; 280/492
[58] Field of Search ................... 180/9.44, 9.46, 180/14.1, 14.2, 14.4, 14.3, 418; 280/400, 492, 493, 494

[56] References Cited

U.S. PATENT DOCUMENTS

| | | | |
|---|---|---|---|
| 2,638,353 | 5/1953 | Danielson et al. | 280/492 X |
| 3,937,289 | 2/1976 | Dickinson | 180/9.44 |
| 4,273,353 | 6/1981 | Holmes | 280/492 X |
| 4,290,622 | 9/1981 | Horvath | 280/492 X |
| 4,325,445 | 4/1982 | Albee | 180/14.4 |
| 4,966,242 | 10/1990 | Baillargeon | 180/9.46 X |
| 5,180,028 | 1/1993 | Perrenoud, Jr. | 180/418 X |

FOREIGN PATENT DOCUMENTS

| | | | |
|---|---|---|---|
| 954170 | 9/1974 | Canada | 305/41 |
| 1077399 | 5/1980 | Canada | 180/31 |
| 1229729 | 12/1987 | Canada | 37/25 |

*Primary Examiner*—Kevin Hurley
*Attorney, Agent, or Firm*—Mario D. Theriault

[57] ABSTRACT

An articulated vehicle made of a front and of a rear vehicle body of which the chassis are connected by an articulated joint. The articulated joint comprises a steering axis, a first longitudinal roll axis on the front chassis, and a second longitudinal roll axis on the rear chassis. In a structural sense, the articulated joint of the present invention comprises a first swivel member and a first shaft mounting this first swivel member on the front chassis for relative oscillation of the first swivel member and of the front chassis about the first longitudinal roll axis. Likewise, a second swivel member and a second shaft mounting this second swivel member on the rear chassis allow relative oscillation of the second swivel member and of the rear chassis about the second longitudinal roll axis. Spaced apart pivot pins are provided for pivotally joining the first and second swivel members together along the steering axis, and allowing pivotal movement of the front and rear chassis while a movement of the front chassis remains co-planar with a movement of the rear chassis. The articulated joint also comprises a first flexible torsion coupling connected between the first swivel member and the front chassis, and a second flexible torsion coupling connected between the second swivel member and the rear chassis for flexibly restraining the relative oscillation of the first and second swivel members and of the front and rear chassis about their respective longitudinal roll axes.

20 Claims, 14 Drawing Sheets

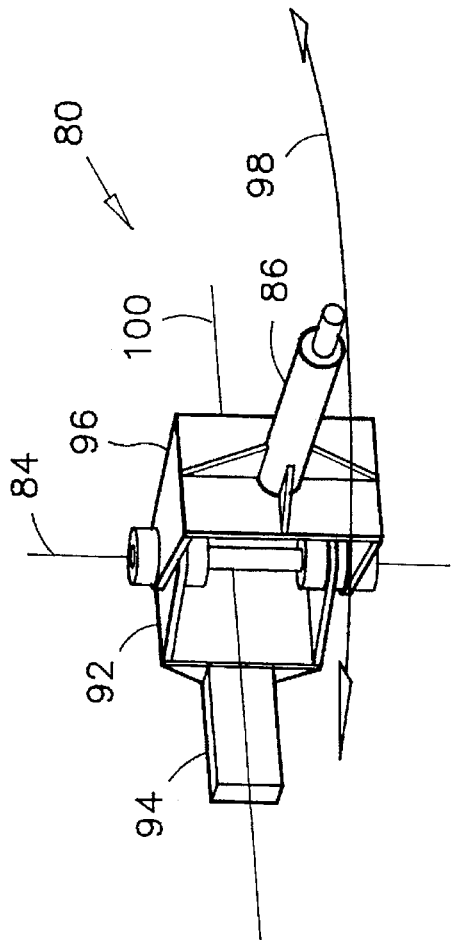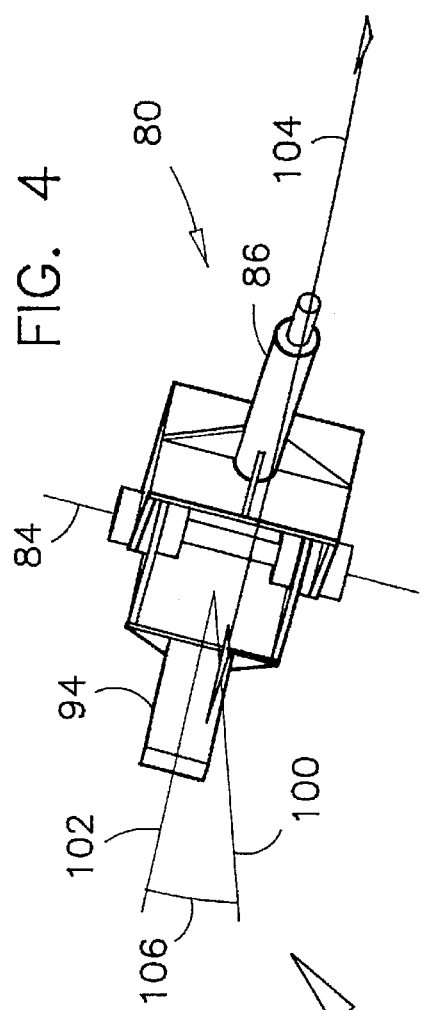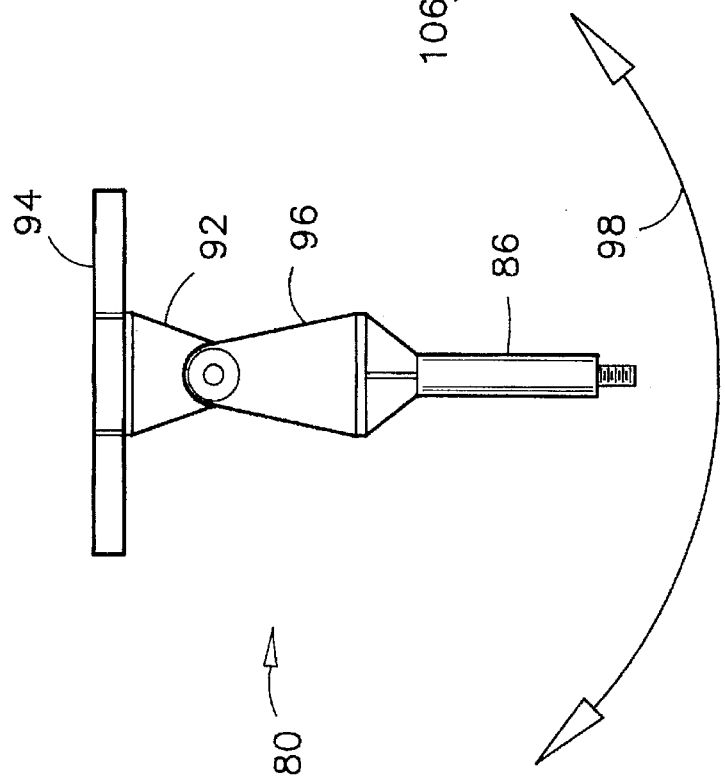

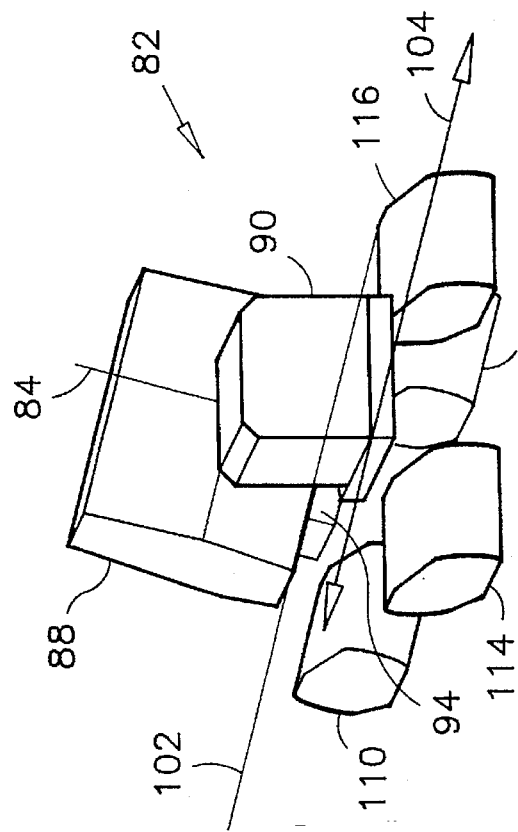
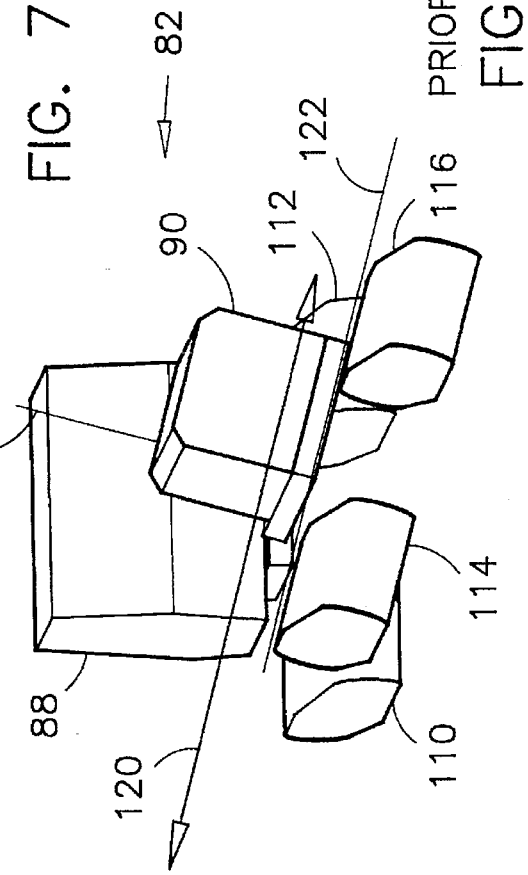
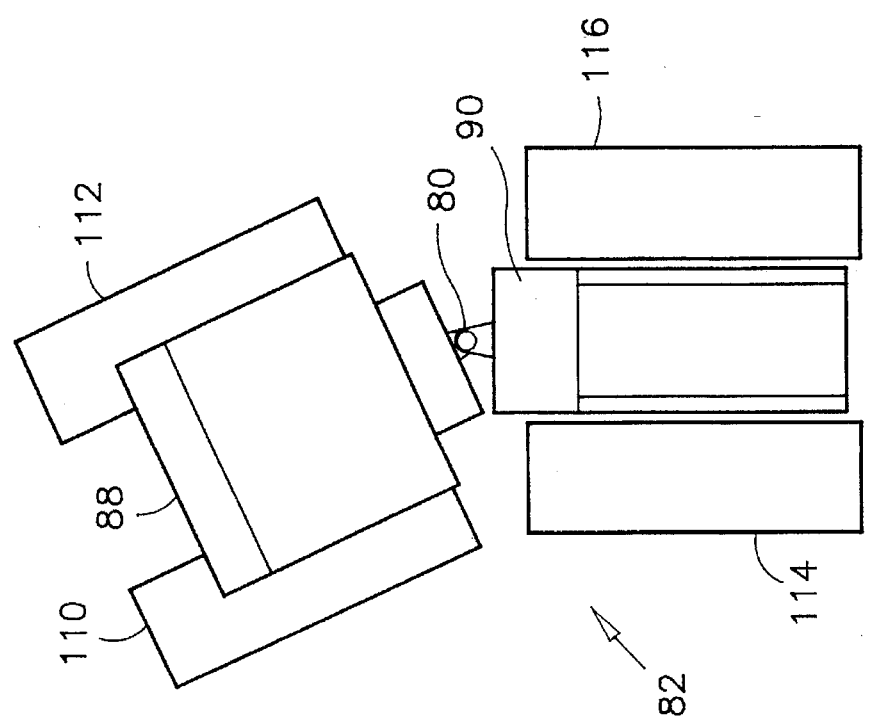
PRIOR ART
FIG. 7
PRIOR ART
FIG. 8
PRIOR ART
FIG. 6

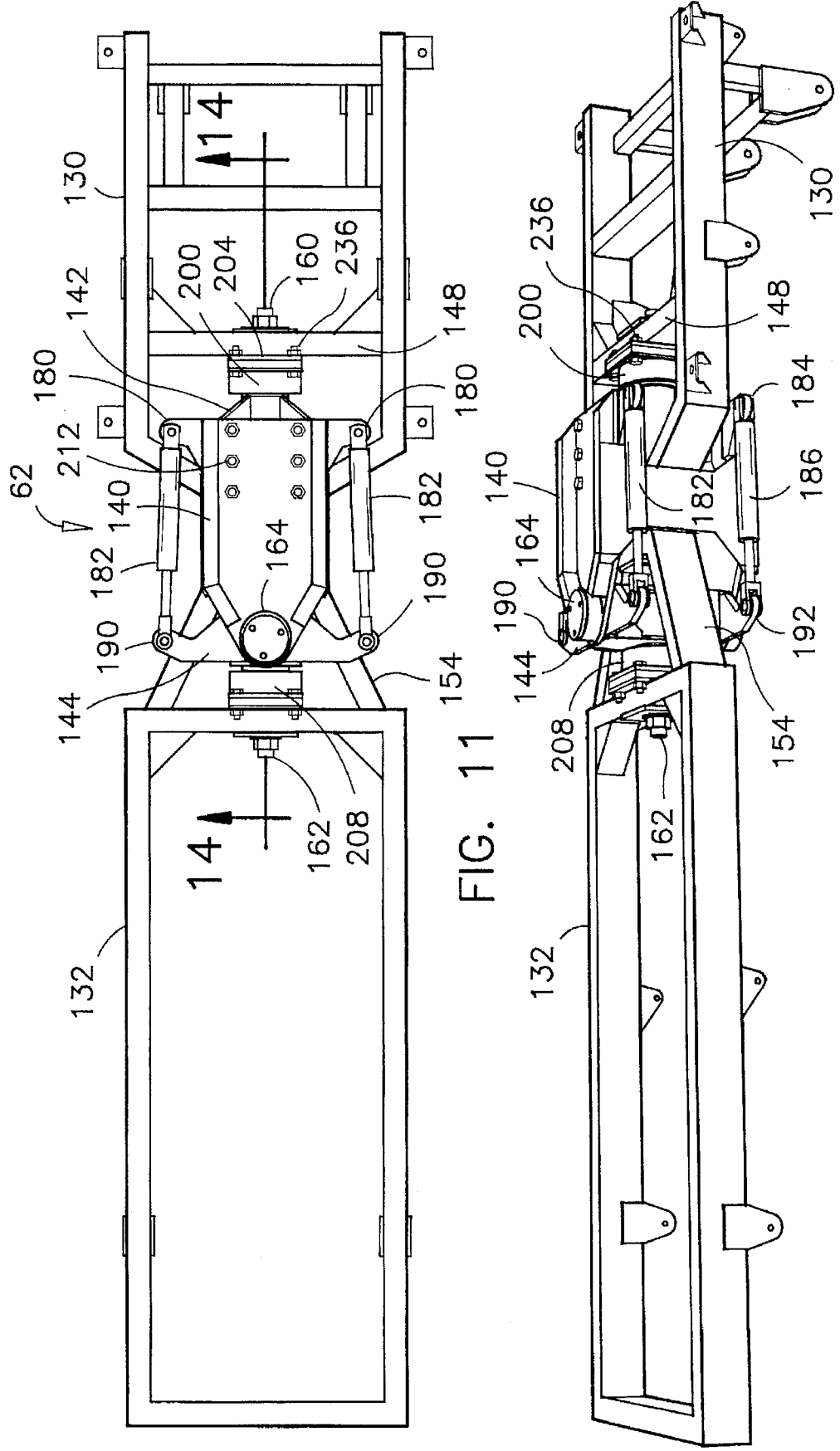

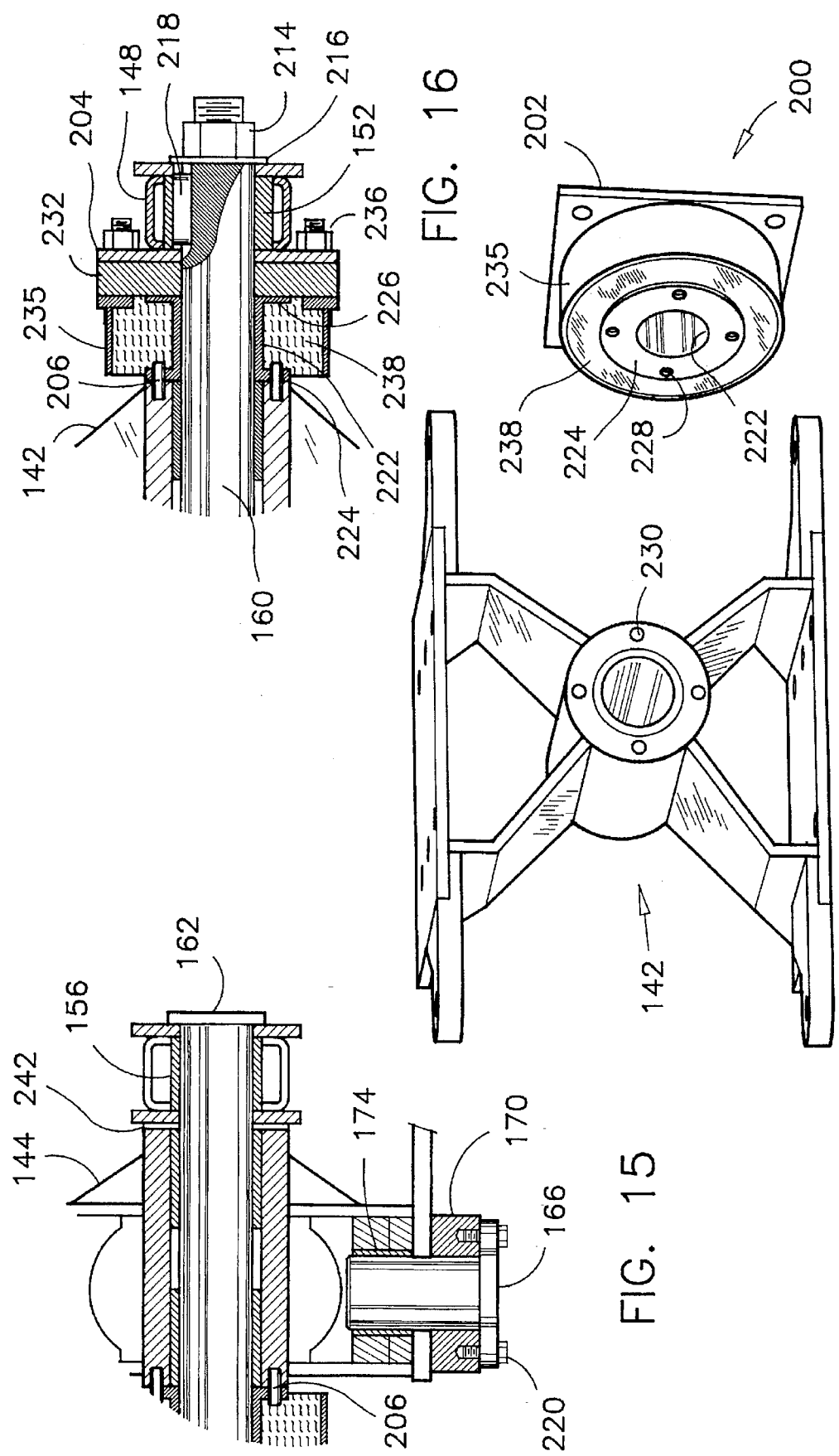

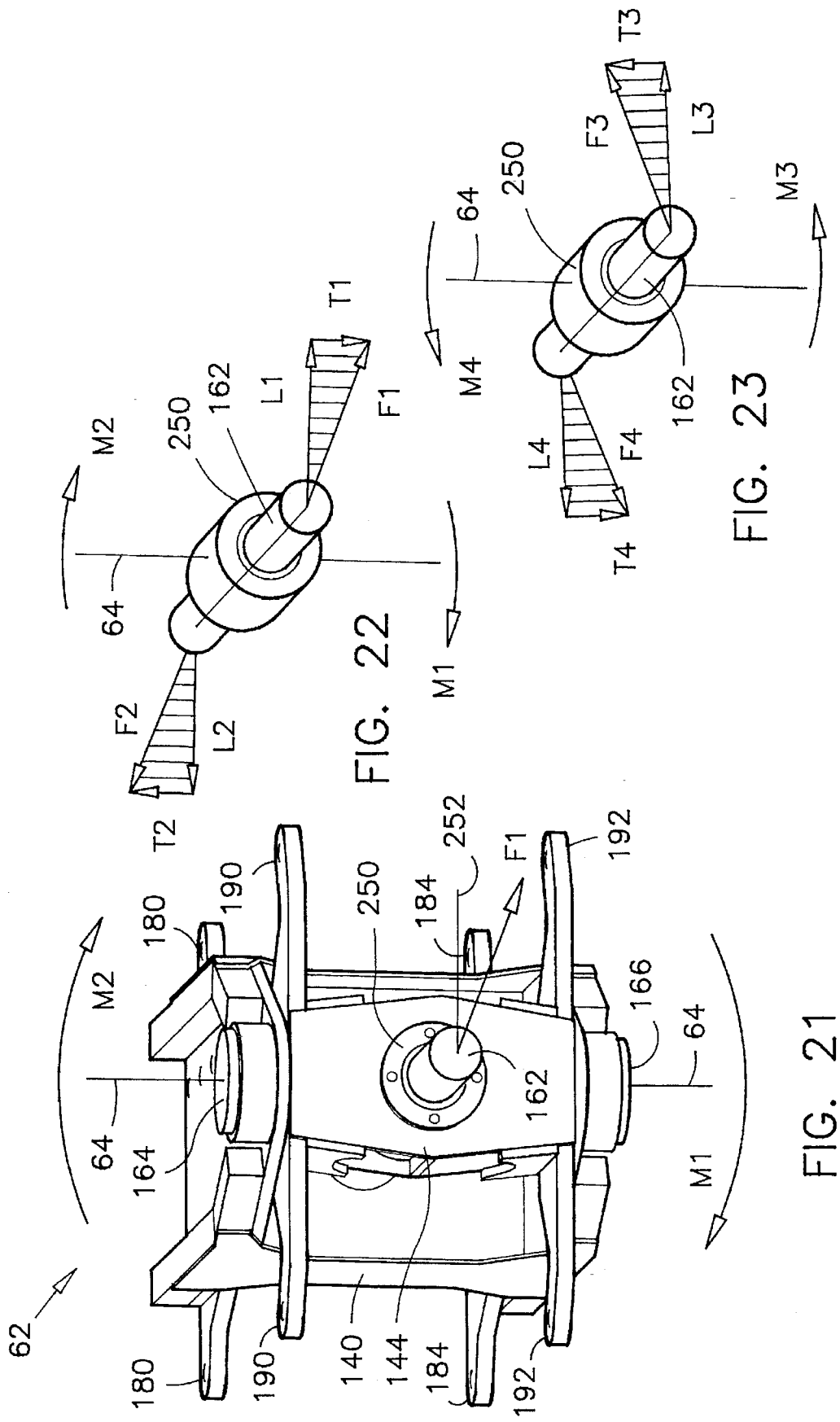

ARTICULATED VEHICLE

FIELD OF THE INVENTION

The present invention relates to an articulated vehicle made of a front and of a rear vehicle body of which the chassis are connected by an articulated joint. More particularly, the invention relates to an articulated vehicle having an articulated joint comprising a steering axis, a first longitudinal roll axis on the front chassis, and a second longitudinal roll axis on the rear chassis.

BACKGROUND OF THE INVENTION

Articulated vehicles of the track-type are generally used for travelling over peat bogs, in swampy regions, or where deep snow or the lack of road makes ordinary travel difficult or impossible. One primary use for articulated vehicles is the towing of grooming equipment for conditioning snowmobile and cross-country ski trails, and ski slopes.

Ski slopes and snowmobile trails require periodic grooming to level moguls, to scrape icy stretches and to lay an even thickness of fresh snow across slope and trail surfaces. Many of these ski resort areas extend over hundreds, even thousands of acres, part of which are precipitously steep. Similarly, snowmobile and cross-country ski trails generally span great distances over rugged and hilly terrains.

The articulated vehicles used to tow trail grooming equipment must be capable of great tractive effort so as to be able to effectively climb, descend, and traverse very steep and often irregular slopes. These articulated vehicles must be easily maneuverable, fast, stable, and controllable under the widely varying conditions usually encountered.

Various articulated all-terrain vehicles have been designed in the past. Those vehicles generally consist of a front body having two endless crawler tracks and comprising the operator's cab, and a rear body also having two endless crawler tracks and normally comprising the engine compartment. The front body is generally connected to the rear body by an articulated joint having a vertical steer axis. A longitudinal roll axis is also usually provided on one of the rear or the front body. The longitudinal roll axis on the rear body for example, is generally relative to the front body, for the forward part of the articulated joint is normally rigidly attached to the front body.

A common defect of those articulated vehicle is that when the front body tilts, from one track climbing over a mound for example, the steer axis also leans sideways. The plane of steering is thereby inclined relative to the ground or snow surface. Thus when the vehicle steers in this position, torsional and bending stresses are imposed on both body frames from the prying of the rear body on the longitudinal roll axis. Such a contorted condition causes an uneven distribution of the machine's weight over each of the four tracks.

Therefore, with conventional four-track vehicles of the like, both control over steering and hill climbing ability are usually adversely affected by track slippage and track digging-in.

As a first example of an articulated vehicle of the prior art, the Canadian Patent No. 1,077,399, issued on May 13, 1980 to Nell W. Plerson, discloses an all-terrain vehicle of the articulated type including a first unit, and a second unit pivotally and rotatably inter-connected with the first unit. The forward portion of the articulated joint is rigidly attached to the frame of the first unit. Hence, the steer axis of the joint follows the tilting movement of the front unit.

As another example of prior art articulated vehicle, U.S. Pat. No. 3,937,289, issued on Feb. 10, 1976, to Lawrence Chapman Dickinson, discloses an articulated vehicle having an articulated joint joining a fore and aft body frame members, and permitting relative rolling motion and relative yawing motion therebetween. The front portion of the joint on this vehicle is rigidly attached to the fore body member.

In another example, U.S. Pat. No. 4,966,242, issued on Oct. 30, 1990 to Bernard Baillargeon, discloses an all-terrain vehicle having an articulated joint with a vertical steer axis, and wherein the front frame is capable of oscillation about a roll axis located above the two frames and extending parallel to the longitudinal axis of the both frames. In this case, the steer axis of this vehicle is fixed to the rear frame.

In a further example, U.S. Pat. No. 5,113,958, issued on May 19, 1992, to Thomas R. Holden, discloses a vehicle where the chassis of the vehicle is pivoted about a vertical axis for limited side-to-side relative movement for steering, and pivoted about a horizontal axis for limited movement to accommodate ground irregularities. A vertical pivot pin is supported between parallel spaced apart transverse horizontal plates at the rearward end of forward chassis. A pair of tie rods with spherical bearings join the lower transverse plate to the rear chassis, permitting relative rotation about both vertical and horizontal axes. The steer axis on this vehicle is also in a fixed relationship with the front chassis.

The foregoing examples are just a few representative examples of all-terrain articulated vehicles of the prior art. It is a general condition of those vehicles that the oscillating motion of the front or of the rear body member about the longitudinal axis of the vehicle is theoretically possible only when both portions of the vehicle are in-line with one-another.

When the vehicle steers, the body portion carrying the fixed part of the articulated joint must remain substantially parallel to the actual plane of steering of the vehicle. Otherwise, the stresses applied on the frames from the misalignment of the plane of movement of the roll axis with the direction of displacement of the rear body during steering, causes an uneven pressure distribution of the tracks on the ground or snow surface. The maximum tractive effort of one, two or sometimes three tracks is thereby reduced.

Furthermore, such uneven pressure distribution of the tracks during steering causes track slippage and track digging-in. Consequently the vehicle leaves deep track traces on slopes and trails. Those track traces are ordinarily undesirable, especially when the vehicle is travelling without grooming equipment.

SUMMARY OF THE INVENTION

In the present invention however, there is provided in a broad sense, an articulated vehicle comprising a first vehicle body including a first body frame having a first longitudinal axis, and having ground-engaging means on a first side and second side thereof. The articulated vehicle of the present invention also has a second vehicle body including a second body frame having a second longitudinal axis, and also having ground-engaging means on a first and second sides thereof.

The first body frame and the second body frame are connected by an articulated joint allowing relative lateral oscillation of the first vehicle body about the first longitudinal axis, and allowing lateral oscillation of the second vehicle body about the second longitudinal axis. The articulated joint of the present invention further allows relative pivotal movement of the first vehicle body and the second vehicle body about a steering axis perpendicular to the first and to the second longitudinal axes.

In a structural sense, the articulated joint of the present invention comprises a first swivel member and a first shaft mounting this first swivel member on the first body frame for relative oscillation of the first swivel member and of the first vehicle body about the first longitudinal axis. Likewise, a second swivel member and a second shaft mounting this second swivel member on the second body frame allow relative oscillation of the second swivel member and of the second vehicle body about the second longitudinal axis.

Furthermore, the articulated joint comprises pivot pins pivotally joining the first and second swivel members together along the steering axis, and allowing pivotal movement of the first and second vehicle bodies while a movement of the first body frame remains substantially co-planar with a movement of the second body frame.

The articulated joint of the articulated vehicle of the present invention also comprises a first restrictively flexible torsion coupling connected between the first swivel member and the first body frame for flexibly restraining the relative oscillation of the first swivel member and of the first vehicle body about the first longitudinal axis.

A first advantage of this embodiment is that both vehicle bodies are allowed to oscillate about their respective longitudinal axes while the vehicle steers. The steering axis of the articulated joint is not fixed to neither the first body frame nor the second body frame. Therefore the steering axis is free to aligned itself from the moments applied thereon by the steering actuators, as it will be explained later in the detailed description of the invention, into an alignment which is substantially perpendicular to the actual plane of the ground or snow surface on which the vehicle steers.

Consequently, the steering of the vehicle does not applied undue stresses of the frames of the vehicle. The surface pressure and a corresponding tractive power on each of the four tracks remains substantially constant and equal despite extreme articulations of the vehicle.

In accordance to another aspect of the present invention, the articulated joint of the articulated vehicle further comprises a second restrictively flexible torsion coupling connected between the second swivel member and the second body frame, for flexibly restraining the relative oscillation of the second swivel member and of the second vehicle body about the second longitudinal axis.

Hence, a second advantage of this other aspect of the present invention is that the steering axis is flexibly maintained at a mid-point between a first line normal to the first body frame and a second line normal to the second body frame. The steering axis thus retained is in an ideal position at or close to an alignment perpendicular to the true plane of steering of the vehicle. The steering axis is therefore readily displaced into an alignment perpendicular to the true plane of steering as soon as pressure is applied thereon by the steering actuators.

This aspect of the present invention is an improvement of the control over steering of the vehicle as compared to articulated joints of the prior art. The control over steering is responsive with constant hydraulic pressure throughout the steering stroke, and thereby responsive at constant steering speed.

In accordance to yet another aspect of the present invention, the first shaft mounting the first swivel member on the first body frame has a first end and a second end spaced about the first swivel member. The first shaft is held in the first body frame by means of a first bushing on the first end and of a second bushing on a the second end of the shaft.

Such mounting of the first shaft with spaced apart supports, provides for greater longitudinal stiffness of the articulated vehicle, than other prior art vehicle having a pivot stem mounted in a projection mode.

In accordance to a further aspect of the articulated vehicle of the present invention, a scraper blade at a front portion of the vehicle is also articulated about an axis which is parallel to the axis of lateral oscillation of the front vehicle body.

The articulation of the scraper blade of the articulated vehicle of the present invention comprises a first arm connected at a first end to a first clevis on the front body frame by means of a first spherical bearing. The first arm is connected at a second end to the scraper blade by means of a first uniaxial pivot.

The articulation for the scraper blade also comprises a second arm connected at a first end to a second clevis on the front body frame by means of a second spherical bearing, and at second end to the scraper blade by means of a second uniaxial pivot. Both arms are spaced apart and parallel to one-another. Both uniaxial pivots are attached to the scraper blade along a common axis.

The first arm has a first lateral extension pointing toward the second arm, and the second arm has a second lateral extension pointing toward the first arm. The first lateral extension and the second lateral extension are overlapping at a distance from one-another.

An hydraulic cylinder is mounted on the first lateral extension, while the cylinder rod is resiliently attached to the second lateral extension. Thus an extension and retraction of the cylinder rod from a supply of hydraulic power thereto causes the first and second arms to tilt in a common direction about their respective longitudinal axis. Such tilting motion causes the scraper blade to incline according to an actual alignment of the uniaxial pivots of both arms.

A further advantage of the present invention is that the mechanism to tilt the scraper blade of the articulated vehicle is compact in size, easy to manufacture, mechanically simple, and effectively responsive to hydraulic controls. The mechanism to articulate the blade is advantageously used in combination to the articulated joint of the present invention wherein the front portion of the articulated vehicle is allowed to oscillate about its longitudinal axis. The articulated vehicle is thereby very agile and performant during the levelling of irregular snow surfaces.

BRIEF DESCRIPTION OF THE DRAWINGS

The preferred embodiment of the invention will be further understood from the following description, with reference to the drawings in which;

FIG. 3 is a plan view of a typical articulated joint for articulated vehicles of the prior art.

FIG. 4 is a perspective view of the articulated joint of FIG. 3 where the vertical steer axis is perpendicular to a horizontal plane.

FIG. 5 is a perspective view of the articulated joint of FIG. 3 and 4 in which the steer axis is inclined relative to a horizontal plane.

FIG. 6 is a schematic diagram of a top view of a typical articulated vehicle of the prior art, having the articulated joint of FIG. 3.

FIG. 7 is a schematic perspective view of the prior art articulated vehicle of FIG. 6, in which the forward body portion is tilted from a horizontal plane.

FIG. 8 is another schematic perspective view of the prior art articulated vehicle of FIG. 6 in which the rear body portion is tilted from a horizontal plane.

FIG. 11 is a plan view of the frame of the preferred embodiment of the present invention.

FIG. 12 is a perspective view of the frame of FIG. 11.

FIG. 15 is an enlarged view of detail 15 of FIG. 14.

FIG. 16 is an enlarged view of detail 16 of FIG. 14.

FIG. 17 is a perspective view of the front swivel member of the articulated joint of the preferred embodiment of the present invention.

FIG. 18 is a perspective view of a torsion coupling of the articulated joint of the preferred embodiment of the present invention.

FIG. 21 is a perspective illustration of the articulated joint of the preferred embodiment, and of the moments applied on the steer axis during articulation of the vehicle.

FIG. 22 is a force diagram explaining the moments applied on the steer axis of the articulated joint during articulation of the vehicle in a plane which is not parallel to one or both body portions.

FIG. 23 is another force diagram explaining the moments applied on the steer axis during another steering condition where the steer axis is not perpendicular to the direction of articulation.

DETAILED DESCRIPTION OF THE PREFERRED EMBODIMENT

Figure 1:
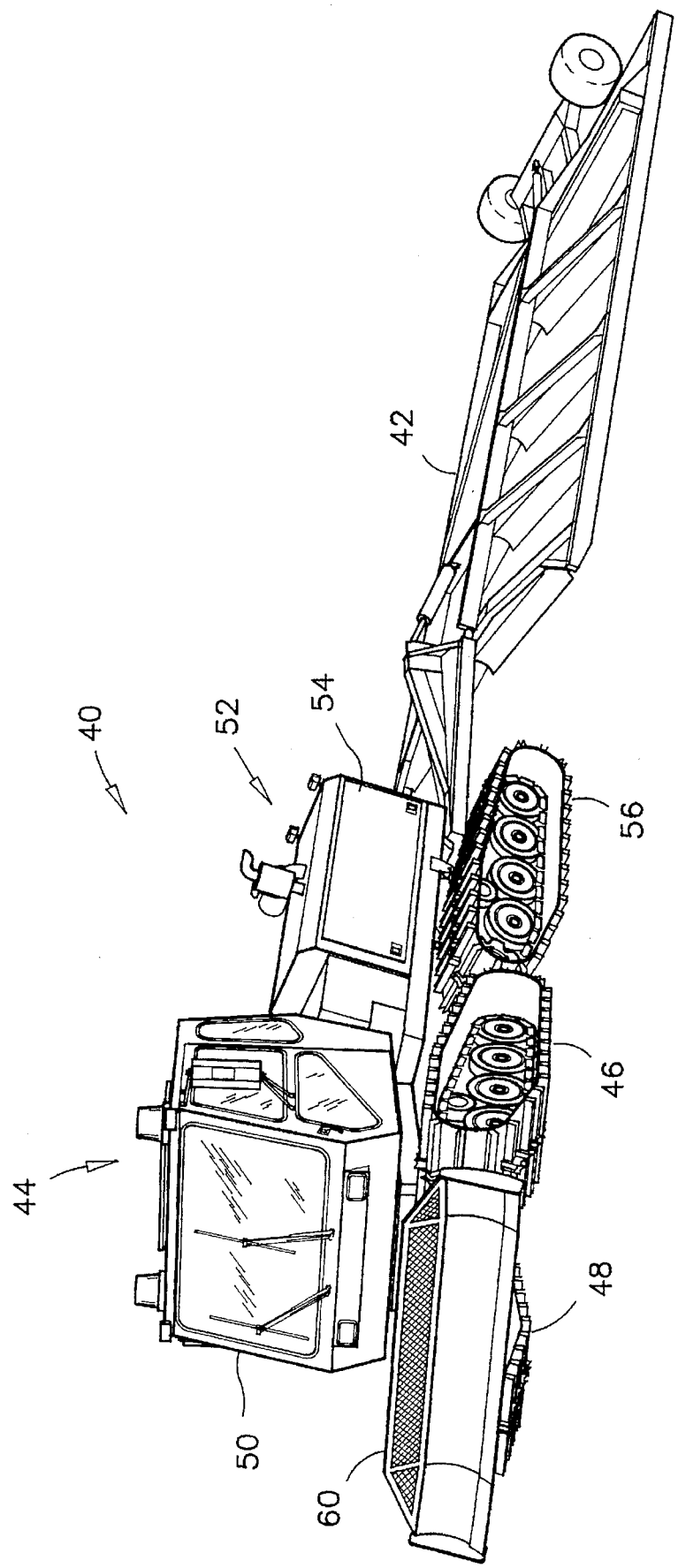
FIG. 1 is a perspective view of the articulated vehicle of the present invention, towing a trail grooming scraper on an irregular slope.

Referring to FIG. 1, there is illustrated an articulated vehicle 40 towing a snowmobile trail grooming scraper 42. The articulated vehicle 40 comprises a front body 44 having two hydraulically driven endless cleated crawler tracks 46, 48, and an operator cab 50. The articulated vehicle 40 also has a rear body 52 having an engine compartment 54 and also having two endless cleated crawler tracks 56, 58. The articulated vehicle of the preferred embodiment also has a front scraper blade 60.

The articulated vehicle 40 of the preferred embodiment is shown steering while travelling on an inclined surface having a varying pitch, such that the plane on the front body 44 is not parallel with the plane of the rear body 52. This condition is encountered frequently during the grooming of ski slopes and snowmobile trails. The illustration represents a typical situation where the articulated vehicle of the present invention has definite advantages over other articulated vehicles of the prior art. This will be explained in greater details when describing other figures, in particular FIGS. 2 to 8.

Figure 2:
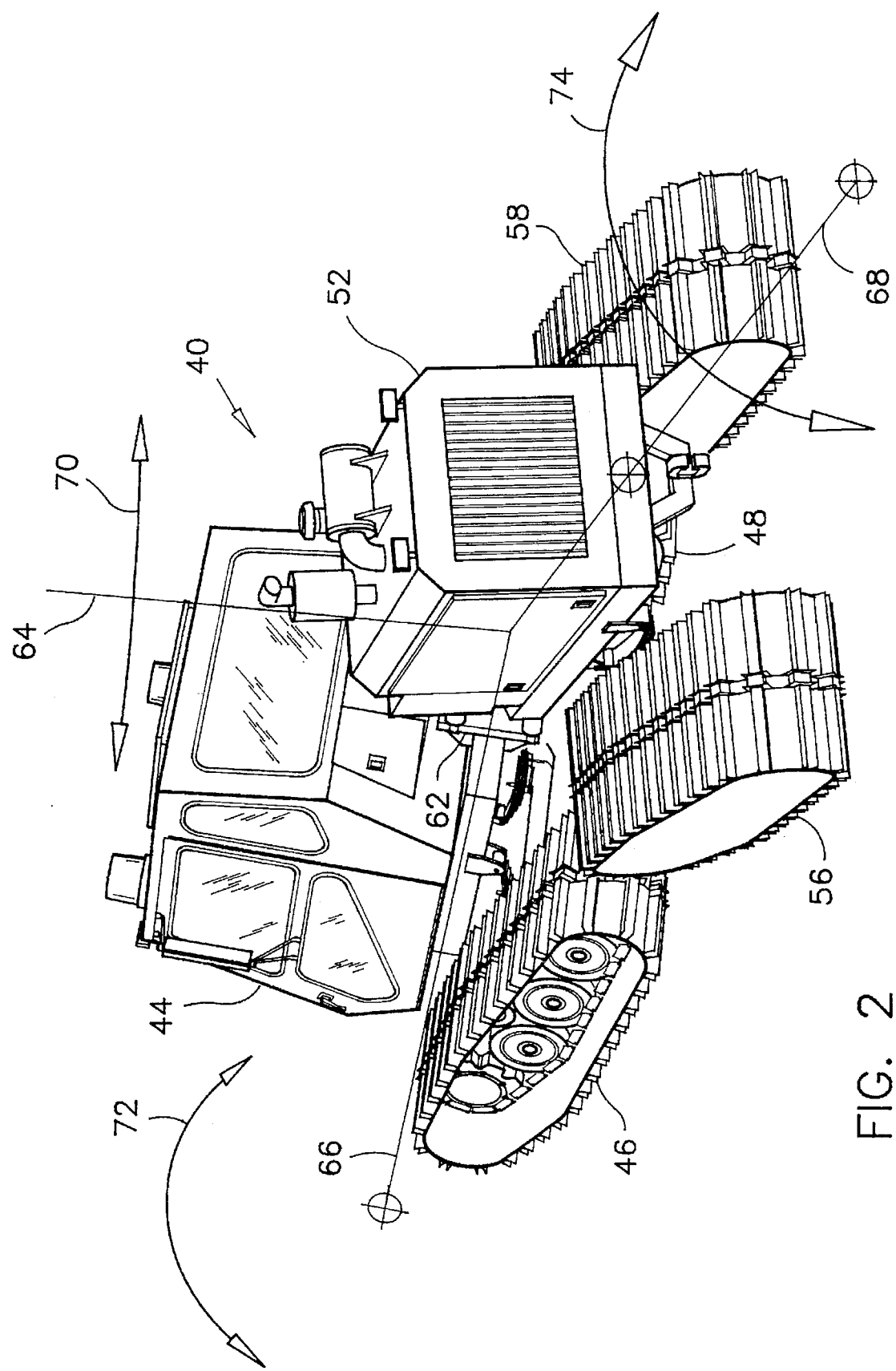
FIG. 2 is another perspective view of the articulated vehicle of FIG. 1 illustrating a rear view thereof.

Referring now to FIG. 2, there is illustrated a rear view of the vehicle in the contortion of FIG. 1. The articulated vehicle 40 of the present invention comprises an articulated joint 62 having a steer axis 64, a first roll axis 66 on the front body 44, and a second roll axis 68 on the rear body 52. The first roll axis 66 and the second roll axis 68 are independent of one another, such that both portions of the vehicle may oscillate about their respective roll axis without causing an inclination of the steer axis, for the steer axis is not fixed to neither the front body 44 nor the rear body 52.

Thus the articulated vehicle of the present invention may be steered in the direction of arc 70 while the front body portion 44 oscillates about roll axis 66 in the direction of arc 72, and while the rear body portion 52 oscillates about roll axis 68 in a direction indicated by arc 74.

In contrast, the articulated joint 80 of prior art vehicle 82, as illustrated on FIGS. 3 to 8, is limited to a steer axis 84 and one roll axis following longitudinal stem 86 of the illustration of FIG. 3.

The articulated joint 80 of prior art vehicle 82 normally has a portion 92 of the steering joint 80 which is rigidly attached to frame member 94 of the front body portion 88 of the vehicle, while the other portion 96 of the steering joint 80 carries the pivot stem 86 of the roll axis.

When both the front body 88 and the Fear body 90 of the vehicle 82 of the prior art lie on a horizontal plane, the direction of displacement of the rear body 90 during steering follows the direction of arc 98 of FIG. 4. In this case, arc 98 is parallel to reference horizontal line 100.

If however, the front frame 94 is tilted sideways to line 102 of FIGS. 5 and 7, the direction of displacement of the rear body 90 during steering tends to follow arc 104 in a direction perpendicular to steering axis 84. Arc 104 in this case is not parallel to the reference horizontal line 100.

Therefore the steering of the prior art vehicle 82 under this condition, when the rear body 90 still lies on a horizontal ground or snow surface, distorts the frames of the vehicle until the steering axis 84 returns to an alignment which is nearly normal to the actual plane of steering. The corresponding distortion of the front frame of the prior art vehicle 82 in this case is represented by angular displacement 106 in FIG. 5.

In a more practical sense, the steering of the vehicle 82 of the prior art when the front body portion 88 is tilted as illustrated in FIG. 7, causes the rear portion 90 of the vehicle to be pried upwardly, toward the left end of arc 104. Accordingly, the articulation of the vehicle 82 toward a left direction under this condition, results in a reduction of the weight distribution of the machine on both rear tracks 114 and 116, and on the right front track 112, while the front left track 110 sustains a proportional increase in surface pressure.

Likewise, when the vehicle steers toward a right direction in the contortion of FIG. 7, the rear body portion 90 is forced downwardly. The weight of the machine is thus transferred onto tracks 112,114 and 116. Track 110 in this case may be exposed to slippage from a corresponding reduction in surface pressure.

One would also understand that if the rigid portion 92 of the articulated joint 80 of the prior art vehicle 82 is attached to the rear body 90 of the vehicle, the stresses applied on the articulation are similar as for the aforesaid explanation. Accordingly, when the rear body portion 90 is tilted sideways as illustrated on FIG. 8, the direction of steering of the front body 88 tends to follow line 120 which is parallel to a plane of the rear body 90 as represented by reference line 122.

Thus a left steering of the vehicle in this position, when the front body 88 still lies on a horizontal ground or snow surface, results in an increase in surface pressure on track 114, and a corresponding reduction in tractive power on tracks 116, 110 and 112.

Figure 9:
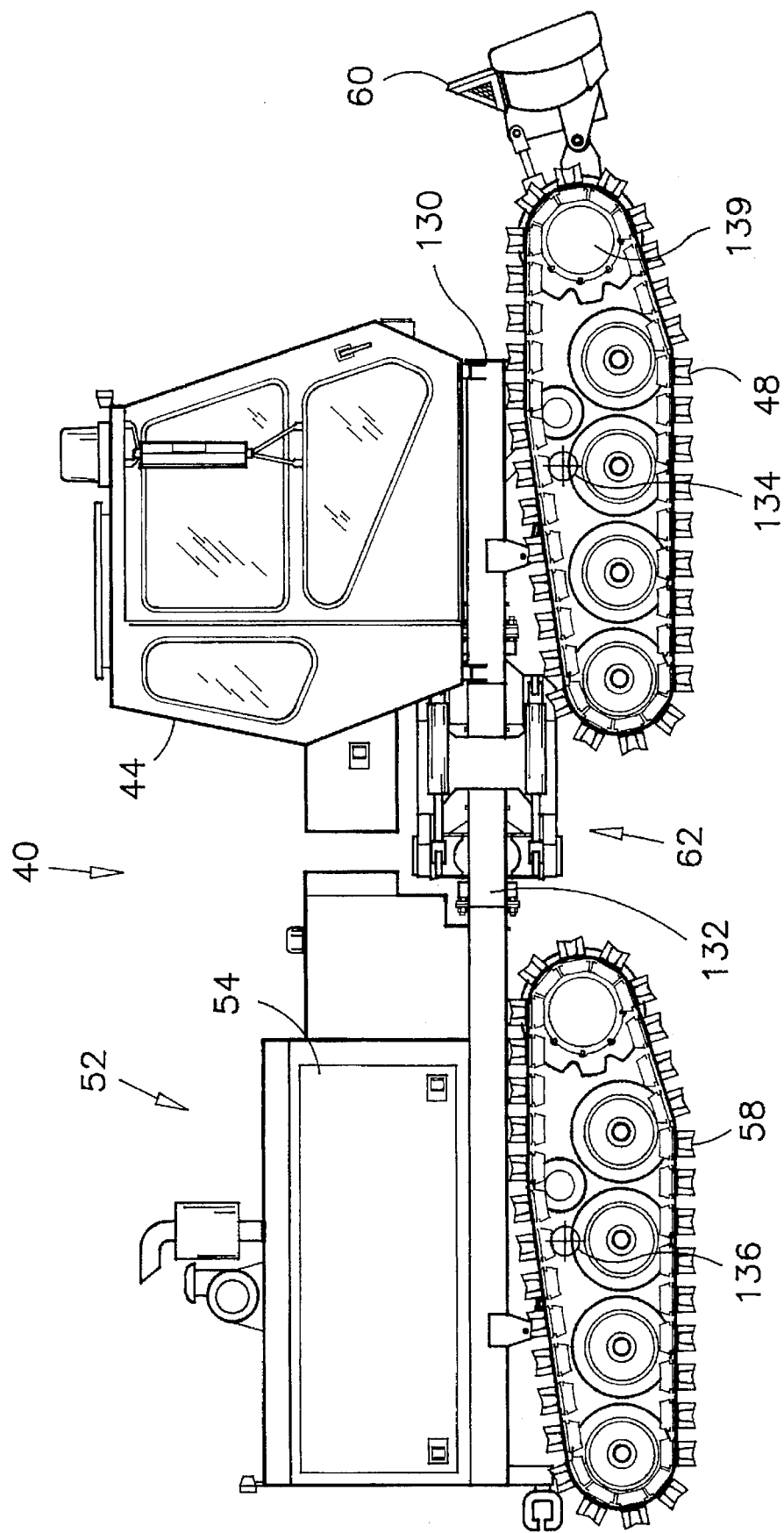
FIG. 9 is a side view of an articulated vehicle of the present invention.
Figure 10:
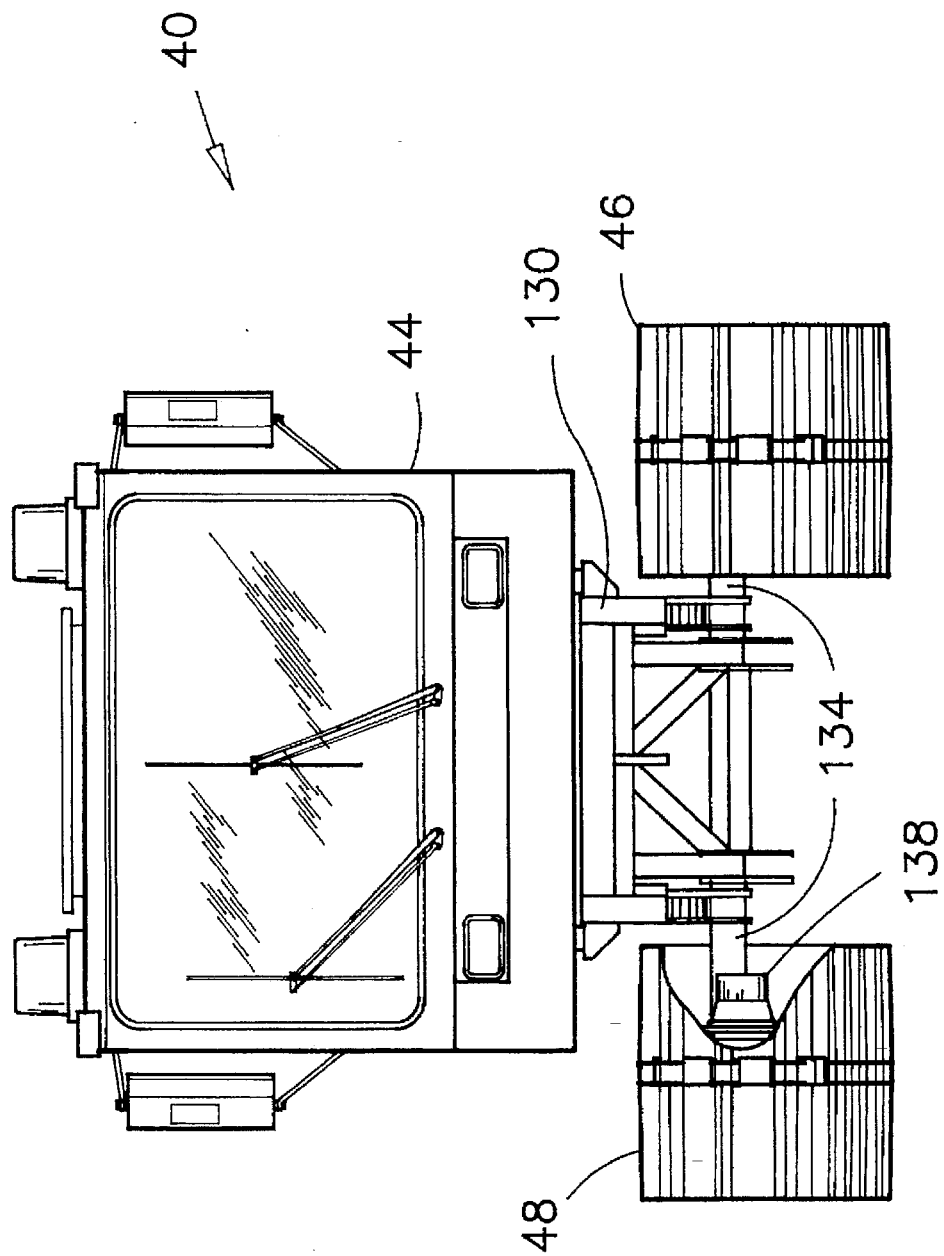
FIG. 10 is a front view of an articulated vehicle of the present invention.

Referring now to FIGS. 9 and 10, the articulated vehicle 40 of the preferred embodiment has a front frame 130 under the front body 44, and a rear frame 132 under the rear body 52. The engine compartment 54 comprises an engine and a hydraulic supply power unit, which are not illustrated here for these components are common in the art of articulated vehicles.

The front endless tracks 46 and 48 are pivotally mounted on axle 134 such that longitudinal pivotal movement of these tracks is possible to follow irregular ground or snow surfaces. The rear endless tracks 56 and 58 are similarly pivotally mounted on axle 136 of the rear body portion 52. All four tracks are individually driven by hydraulic motors 138 preferably connected to a front sprocket 139 in each track. The four tracks are preferably cleated crawler tracks.

Referring now to FIGS. 11, 12, 13 and 14, the articulated joint 62 of the preferred embodiment comprises mainly a steer axis support frame 140, a front swivel member 142, and a rear swivel member 144. The front frame 130 has a polygonal conformation in which two parallel members 146 and 148, have each a respective bushing 150 and 152. The rear frame has a trapezoid-like conformation 154 with a third, and a fourth spaced apart bushings, 156 and 158 respectively.

The front swivel member 142 is pivotally retained into the front frame 130 by means of a front shaft 160 through bushings 150 and 152. Similarly, the rear swivel member 144 is retained into the rear frame 132 by means of a rear shaft 162 through bushing 156 and 158.

The supporting of the front shaft 160 and the rear shaft 162 into a pair of spaced apart bushings ensures minimum stresses on these shafts. Common machine design formulas for shaft deflection indicate that the maximum stress in a shaft which is supported at both ends is four times less than the maximum stress in a shaft supported in a projection mode and having a comparable loading. Thus this particular mounting of the shafts 160 and 162 affords smaller shaft diameters than prior art shafts mounted in a projection condition.

The front swivel member 142 is retained to steer axis support frame 140 by bolting 212 as better seen on FIG. 11. The rear swivel member 144 is pivotally retained to steer axis support frame 140, by means of a top steer pin 164 and a lower steer pin 166. The top steer pin 164 and the lower steer pin 166 are rigidly affixed respectively into a top boss 168 and a lower boss 170 on the steer axis support frame 140.

Each steer pin 164 and 168, protrudes through respective boss 168 and 170 to pivotally connect into a top steer bushing 172 and a lower steer bushing 174 on the rear swivel member 144.

The front swivel member 142 has a pair of holed bracket 180 on its upper side for receiving a first end of a pair of hydraulic cylinders 182. The front swivel member 142 also preferably has another pair of holed brackets 184 on a lower side thereof for receiving a first end of a second pair of hydraulic cylinders 186.

The rear swivel member 144 also preferably has a top pair of holed bracket 190, and a lower pair of holed brackets 192 for receiving respectively a second end of hydraulic cylinders 182 and 186.

The operation of hydraulic cylinders 182 and 186 causes the rear swivel member 144 to rotate about a steering axis 64 defined by pin 164 and 166, to steer the articulated vehicle 40.

One pair of hydraulic cylinders 182 or 186 for example would be sufficient to steer articulated vehicles of relatively low weight and short track span. However, the preferred embodiment of the present invention as described herein suggests two pairs of hydraulic cylinders 182 and 186 in order to limit the torsional stresses on rear swivel member 144 and on front swivel member 142, such that the structural strength and the corresponding manufacturing cost of these members may be kept relatively low.

The front swivel member 142 is further connected to the front frame 130 by means of a resilient torsion coupling 200. The torsion coupling 200 restricts the oscillating movement of the articulated joint 62 about front shaft 160, relative to the front frame 130. The resilient torsion coupling 200 has a square flange 202 which is bolted to a similar square plate 204 on the front bushing 152 of front frame 130. The resilient torsion coupling 200 is further connected to the front end of the front swivel member 142 by means of dowel pins 206 which are better illustrated on FIGS. 14 and 16.

Another resilient torsion coupling 208 is preferably similarly installed on the rear swivel member 144, and connected to a square plate 210 on the rear frame 132. Although one torsion coupling 200 on the front swivel member 142, or on the rear swivel member 144 is sufficient to retain the steering axis 64 from oscillating uncontrollably about a longitudinal axis of the vehicle, a second resilient torsion coupling 208 maintains the steering axis 64 in an ideal alignment as it will be later explained when making reference to FIG. 21.

Figure 14:
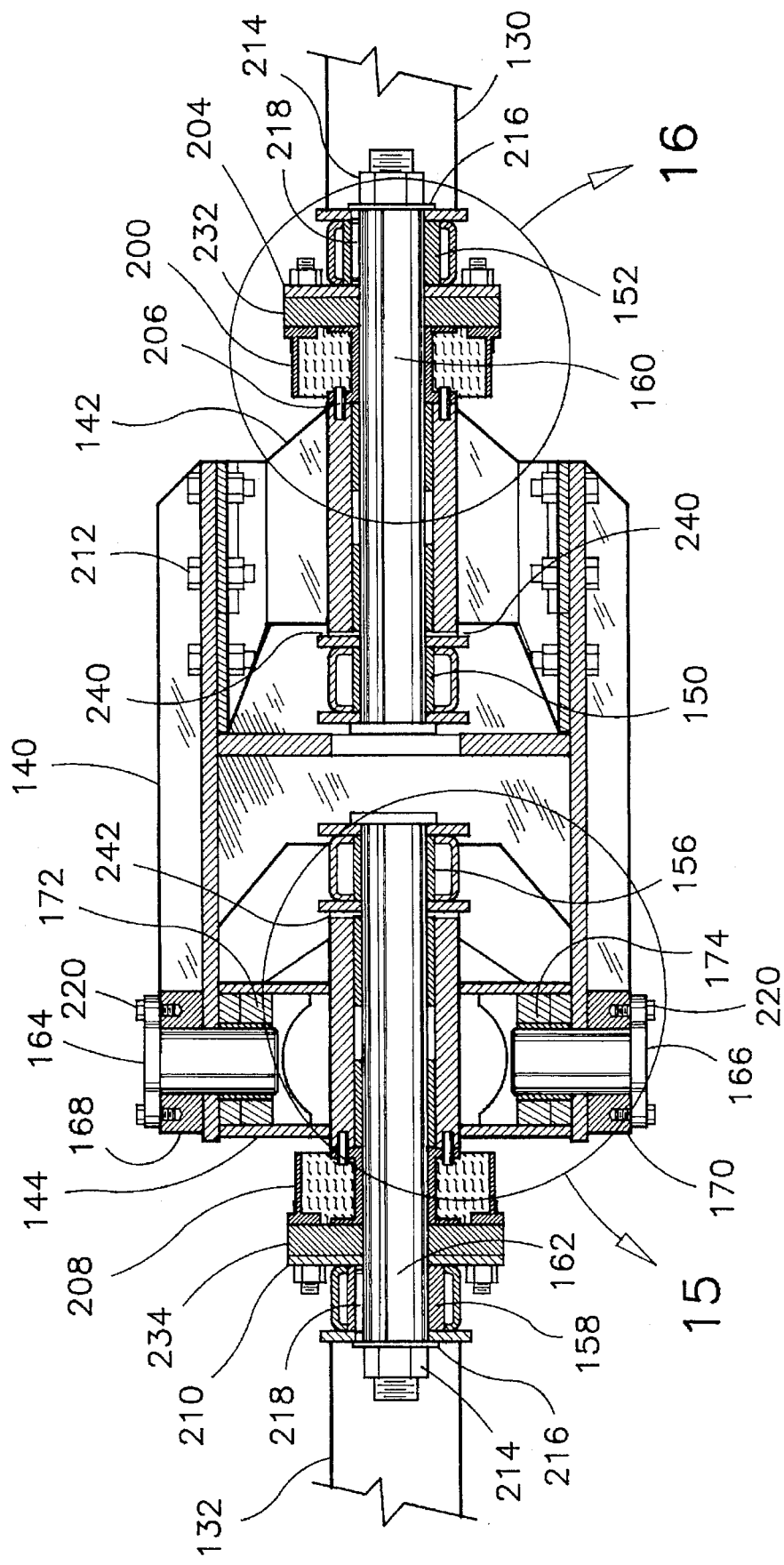
FIG. 14 is a cross-section of the articulated joint of the preferred embodiment, along line 14—14 of FIG. 11.

Referring now specifically to FIGS. 14, 15 and 16, the front swivel member 142 is connected to steering axis support frame 140 by means of bolts 212. The front shaft 160 is held into front bushings 150 and 152 by means of a nut 214 and washer 216 adjacent bushing 152. A straight key 218 locks the front shaft 160 within bushing 152, to prevent a rotational movement of front shaft 160 about its longitudinal axis.

The rear shaft 162 is similarly mounted with a nut 214, a washer 216 and a straight key 218 into bushing 158.

Each steer pin 164 and 166 is preferably retained in its respective boss 168 or 170 by means of screws 220 as better seen on FIG. 15.

Referring now specifically to FIGS. 16, 17, and 18, the torsion coupling 200 comprises a core 222 which is preferably bored to rotate freely on front shaft 160. The core 222 further comprises a first flange 224 and a second flange 226. The first flange 224 has a plurality of holes 228, corresponding in size and spacing to a plurality of holes 230 at one end of the cylindrical portion of the front swivel member 142. A plurality of dowel pins 206 transmits the rotational movements of front swivel member 142 to flange 224.

The inner core 222, together with flanges 224 and 226 transmit the axial forces of the front swivel member 142 to a thrust plate 232. The thrust plate 232 in made of a wear resistant material. The relatively large surface area of flange 226 distributes thrust loads evenly on thrust plate 232, to prevent a premature deterioration of thrust plate 232.

Torsion coupling 200 also has a casing 235 affixed to square flange 202, such that the casing 235 is in a fixed relationship with front frame 130 through bolts 236 in square flange 202 and in square plate 204, as one may better see on FIG. 11 and 12.

Torsion coupling 200 further has a resilient material 238 filling-in a void between core 222 and casing 235. The resilient material 238 is preferably a vulcanized rubber material having dimensions and density to allow for a rotational movement of at least 150 in both directions of rotation of core 222 relative to casing 235.

Figure 13:
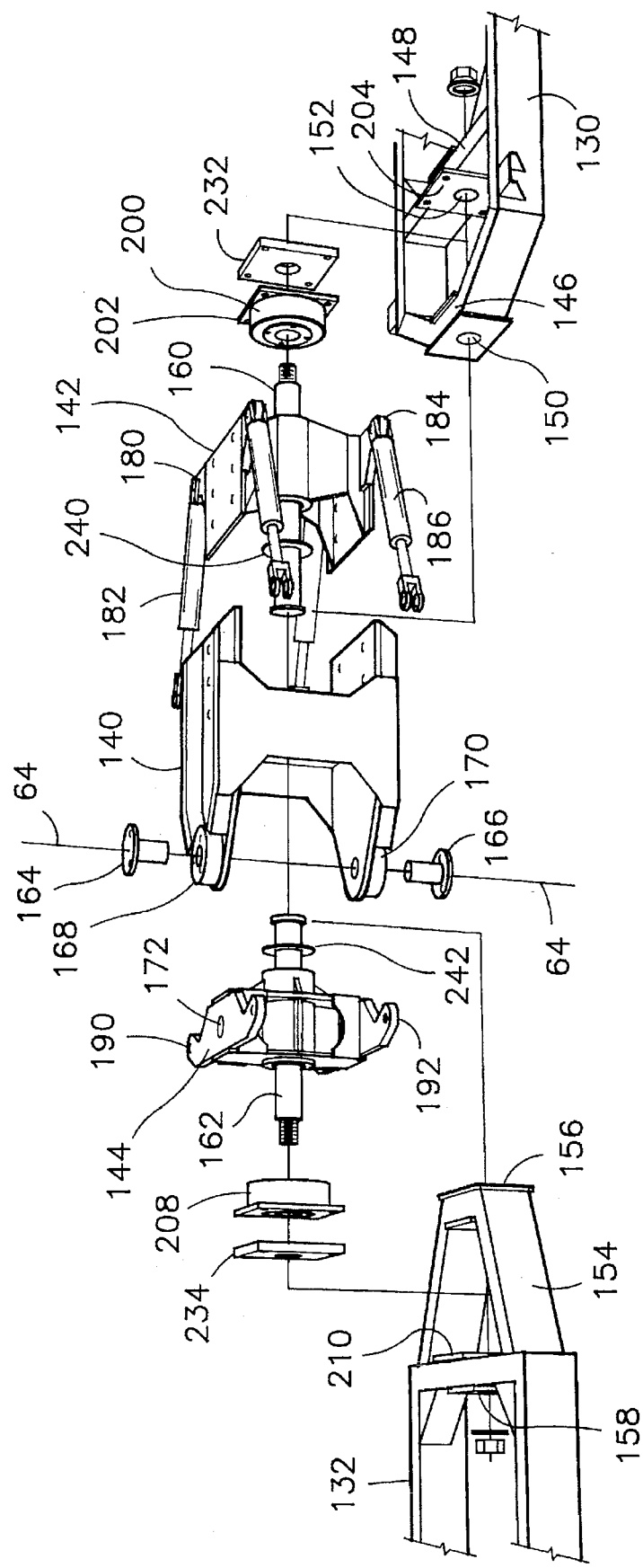
FIG. 13 is an exploded view of the articulated joint of FIGS. 11 and 12.

Referring now back to FIG. 13 and 14, the thrust loading between the front body portion 44 and the rear body portion 52 of the articulated vehicle 40 is also transmitted to front swivel member 142, and rear swivel member 144 respectively through thrust spacers. A first thrust spacer 240 adjacent front bushing 150, and a second thrust spacer 242 adjacent rear bushing 156, are made of a wear resistant material to prevent deterioration of bushings 150 and 156 respectively.

The thrust plates 232 and 234 have a thickness which is more than a length of engagement of dowel pins 206 into holes 228 or 230. This is to facilitate the disassembly of torsion coupling 200 or 208 from the shaft 160 or 162.

The disassembly of the articulated joint 62 consists of removing steer pins 164 and 166, pivot shaft 160 and 162, and removing thrust plates 232 and 234. The torsion couplings 200 and 208 are then slid off their alignment in an upward or downward direction. The remaining of the articulated joint is taken apart by removing screws 212 and by working both swivel members 142 and 144 off frame 130 and 132 respectively.

Figure 20:
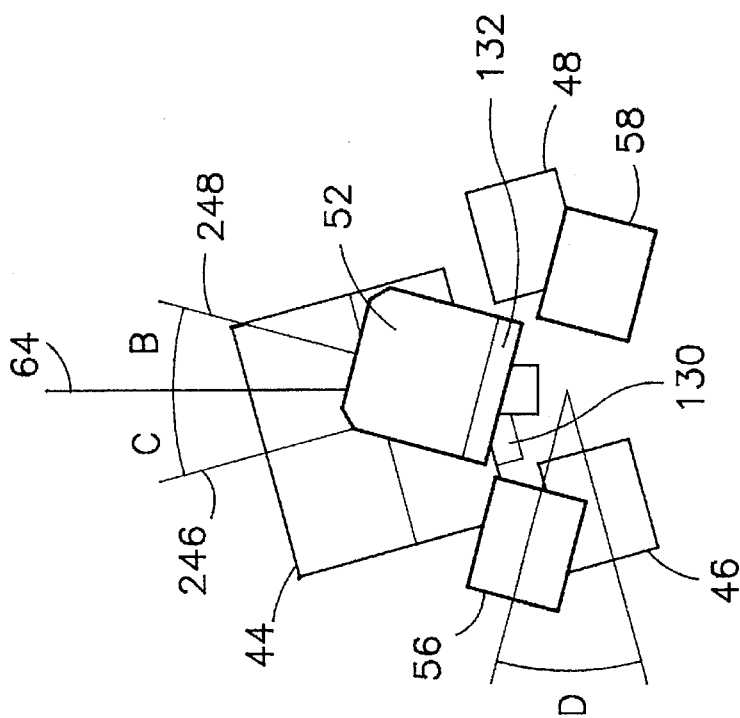
FIG. 20 is a schematic diagram of a rear view of the articulated vehicle of the present invention illustrating a maximum tilting of the front and rear body portions, and of the location of the steer axis relative to the position of the body portions.
Figure 19:
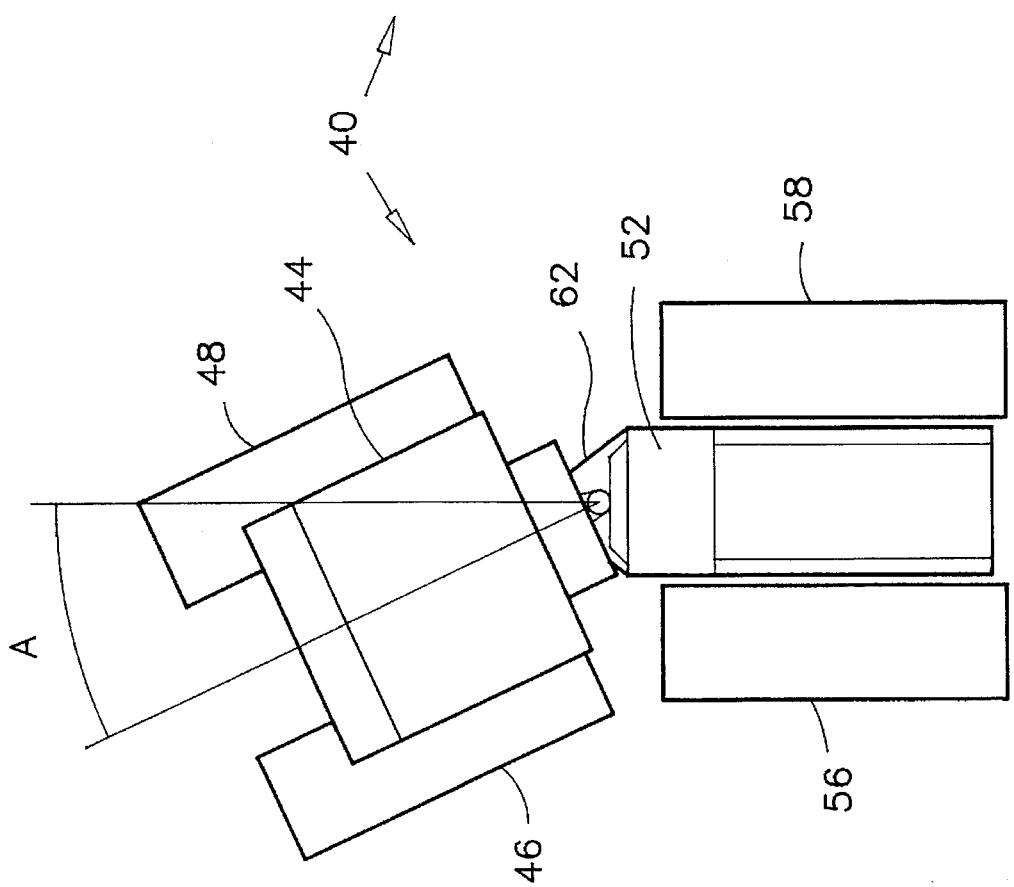
FIG. 19 is a schematic diagram of a top view of an articulated vehicle of the present invention.
Figure 26:
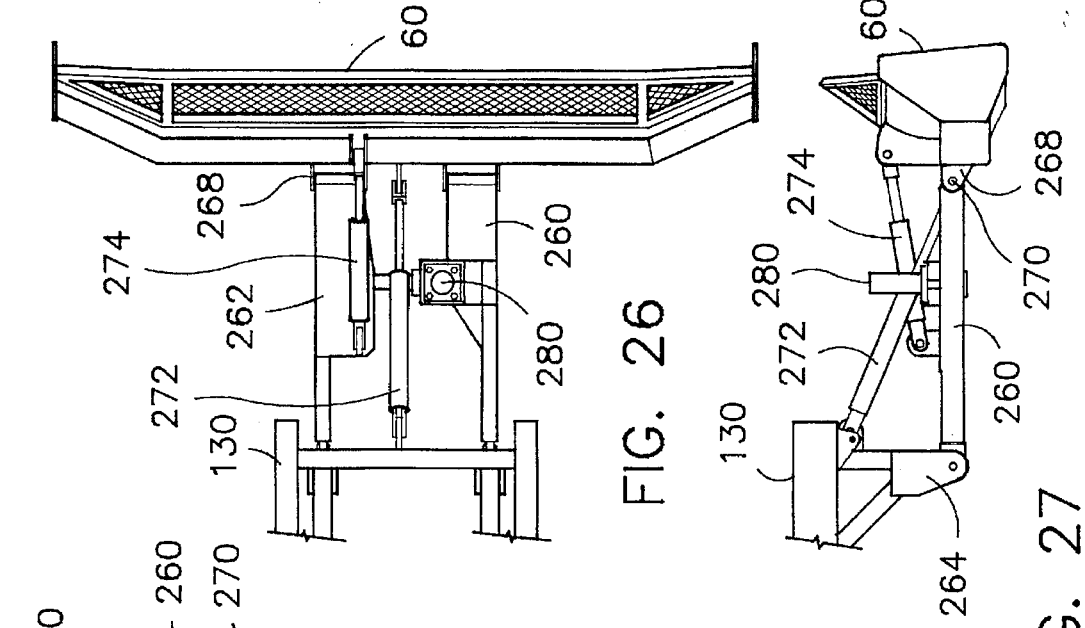
FIG. 26 is a plan view of the forward scraper blade with the support arms attached to the front frame of the articulated vehicle of the preferred embodiment.
Figure 27:
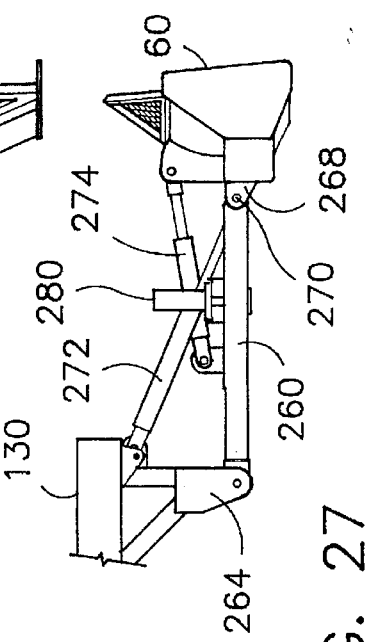
FIG. 27 is a side view of the forward scraper blade of FIGS. 24 and 26.
Figure 25:
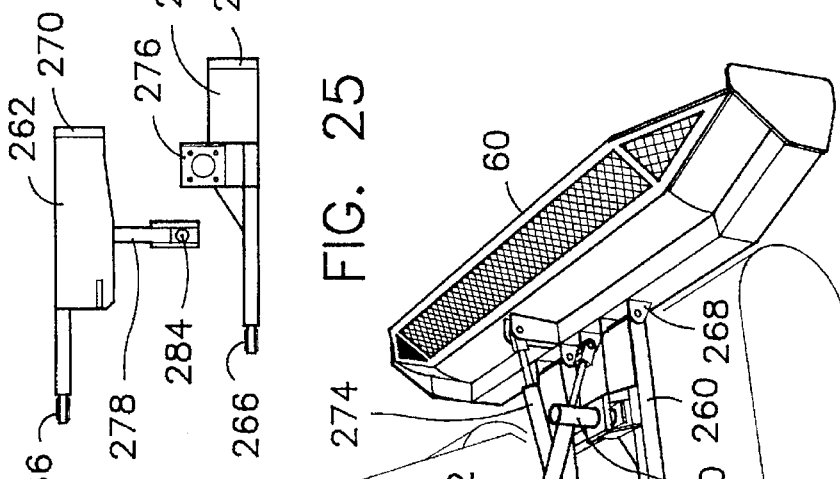
FIG. 25 is a top view of both support arms of the forward scraper blade.
Figure 24:
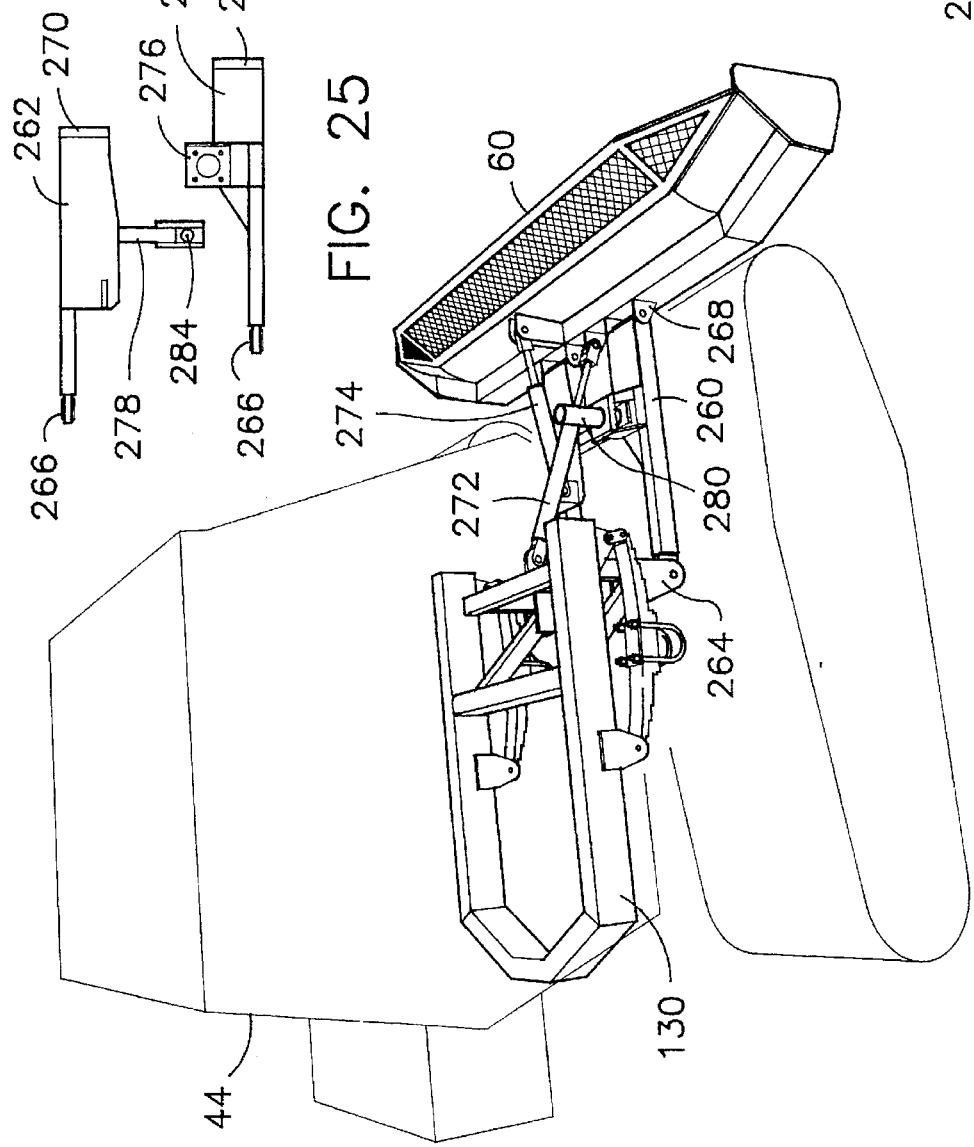
FIG. 24 is a perspective view of the front frame of the articulated vehicle of the present invention and of the support arms for a forward scraper blade.

With the articulated joint thus described, the articulated vehicle 40 of the preferred embodiment as illustrated on FIG. 19 and 20 is preferably dimensioned to steer over an angle A of 25°. The articulated joint 62 is also preferably dimensioned such that the front body 44 and the rear body 55 are allowed to roll about their respective longitudinal axis over a angular displacement B of 15° to the right and C of 15° to the left, for a total oscillatory displacement D between the front body 44 and the rear body 52 of 30°.

The recommended displacements indicated above provide sufficient flexibility to the vehicle to travel without stress under most conditions encountered in ski and snowmobile trails.

When the articulated joint of the preferred embodiment has a torsion coupling on both shafts 160 and 162, the steering axis 64 is maintained resiliently at a mid-point between a line 246 normal to front frame 130, and a line 248 normal to Fear frame 132, as it illustrated on FIG. 20.

When the direction of steering of the vehicle is not perpendicular to the steering axis 64, the forces applied by the shaft 160 and 162 on the swivel members 142 and 144 respectively induce a torque on the articulated joint 62, and force the steering axis 64 to actually position itself perpendicular to the true steering plane. The mechanics of this movement are explained by FIGS. 21 to 23.

On FIGS. 21 and 22, a force F1 and a corresponding and opposite force F2 are applied to the cylindrical part 250 of rear swivel member 144 during the steering of the vehicle 40. The forces F1 and F2 are in a true plane of steering of the vehicle, that is in a true plane of the ground or snow surface on which the vehicle steers. Line 252 represents an hypothetical transversal plane of articulated joint 62 when steering forces are applied thereon. When the forces F1 and F2 are not parallel to a transversal plane 252, the forces F1 and F2 can be vectorially represented by respective lateral forces L1 and L2, plus respective torsional components T1 and T2.

The components T1 and T2 apply a corresponding moment on the cylindrical member 250 in the direction illustrated by arrows M1 and M2. Moments M1 and M2 cause steering axis 64 to rotate about the roll axis of the articulated joint, until transversal plane 252 of joint 62 is aligned with forces F1 and F2, and thus until components T1 and T2 are reduced to zero.

Similarly, when a steering forces F3 and F4 are applied in a different quadrant of cylindrical member 250, than the previous example, the lateral forces are represented by L3 and L4 on FIG. 23. The corresponding torsional forces are labelled T3 and T4. T3 and T4 apply a torque on cylindrical member 250 in the direction illustrated by arrows M3 and M4. Moments M3 and M4 urge steering axis 64 towards an alignment which is perpendicular to the direction of steering.

Thus a first advantage of having a first resilient torsion coupling 200 joining the front frame 130 to the articulated joint 62 is that the steering axis is allowed to be displaced toward an orientation which is perpendicular to the true steering plane of the vehicle.

A further advantage of having two resilient torsion couplings 200 and 208 joining the front frame 130 and the rear frame 132 to the articulated joint 62 is that the steering axis is kept at mid-way between a first line 246 normal to the front frame 130, and a second line 248 normal to the rear frame 132, as illustrated on FIG. 20.

Thus the steering axis is held at the closest location between extreme positions relative to the actual steering plane. The articulated joint is thereby allowed to actually float at an ideal location where it is readily displaced in a position to effect steering of the vehicle without applying stress on the vehicle's frames.

A scraper blade 60 on the front body 44 of an articulated vehicle of the preferred embodiment is preferably also articulated about an axis longitudinal to the front body 44, such that a levelling of ski slopes or portions of snow trails may be effected despite an oscillating motion of the vehicle according to ground irregularities. The preferred support structure for the scraper blade 60 is illustrated on FIGS. 24 to 27.

The scraper blade 60 is attached to the forward end of the front frame 130, by means of a right arm 260 and a left arm 262. The right arm 260 and left arm 262 are attached into clevis brackets 264 on the front frame 130 by means of spherical bearings 266. Spherical bearings 266 provides for tilting each arm 260 and 262 about a respective point of mounting into clevises 264. Spherical bearings 266 also provides for oscillating each arm 260 and 262 about their respective longitudinal axis.

Each of the right arm 260 and left arm 262 is further attached to clevis brackets 268 on the scraper blade 60 by means of an uniaxial pivot 270 on each arm, such that only an up and down circular motion of each arm 260 and 262 about pivots 270 is possible.

An hydraulic cylinder 272 is further connected between front frame 130 and a lower portion of scraper blade 60, to raise and lower scraper blade 60 according to conditions of the surface to be levelled. Another hydraulic cylinder 274 is connected between arm 262 and an upper portion of the scraper blade 60, and is used to vary the vertical plane of scraper blade 60.

The right arm 260 of the scraper blade 60 has a first lateral extension 276 pointing toward left support arm 262 when both arms 260 and 262 are installed on the scraper blade 60. Similarly the left arm 262 has a second lateral extension 278 pointing towards right support arm 260. A rod-end-flange of a third hydraulic cylinder 280 is bolted onto the first lateral extension 276. The rod 282 of cylinder 280 is connected into an opening 284 on second lateral extension 278.

Figure 28:
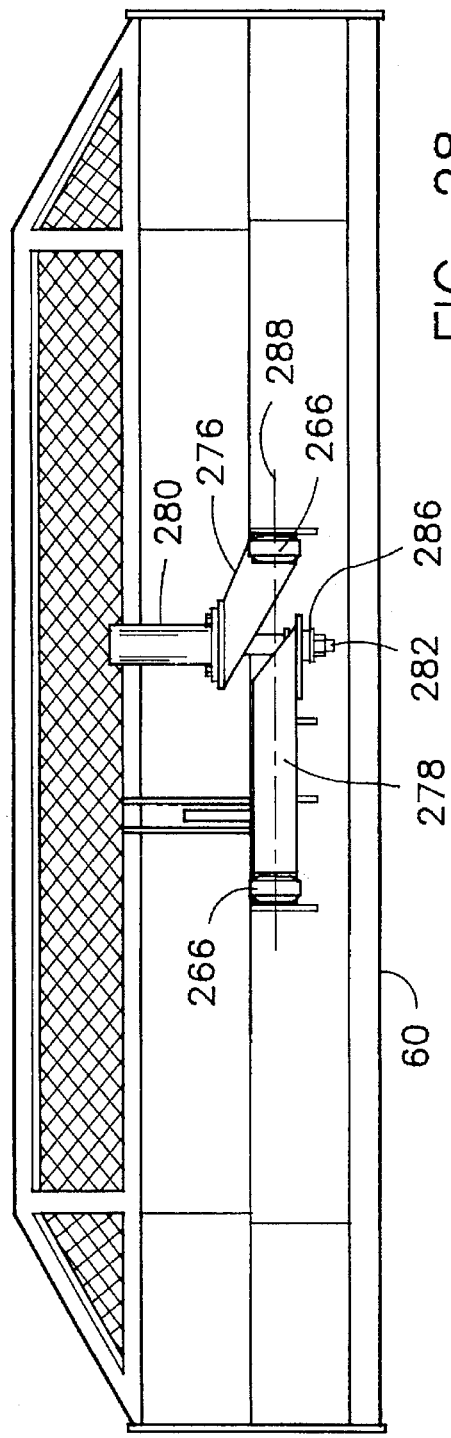
FIG. 28 is rear view of the forward scraper blade of FIG. 24 illustrating the position of the support arms when the scraper blade lies horizontally.
Figure 30:
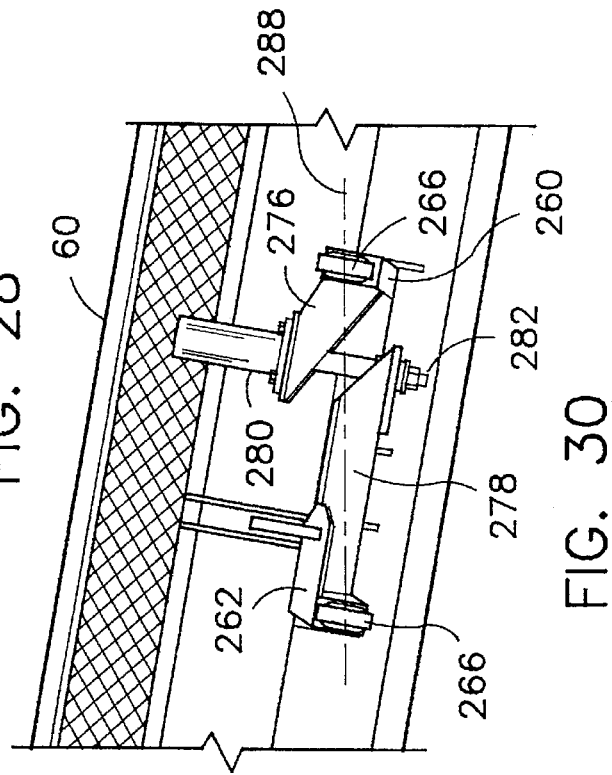
FIG. 30 is a rear view of the forward scraper blade of FIG. 24 illustrating the position of the support arms when the scraper blade is tilted toward the right side of the vehicle.
Figure 29:
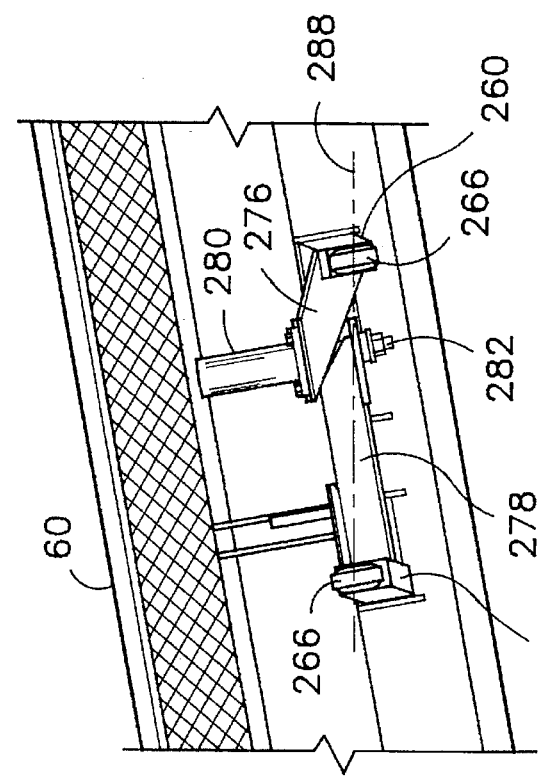
FIG. 29 is a rear view of the forward scraper blade of FIG. 24 illustrating the position of the support arms when the scraper blade is tilted toward the left side of the vehicle.

Referring now to FIGS. 28, 29 and 30, the rod end 282 of cylinder 280 is connected into opening 284 in the second lateral extension 278 by means of a nut and washers on a resilient bushing 286. Resilient bushing 286 allows for a variation in the alignment of opening 284 of the second lateral extension 278 with the hydraulic cylinder 280 during movement of both arms 260 and 262 relative to one-another.

When cylinder 280 is at a mid-stroke position, both lateral extensions 276 and 278 are relatively aligned with an axis 288 of mounting of the spherical bearings 266 to front frame 130. When the rod 282 of the cylinder 280 is retracted, lateral extension 276 is pulled towards lateral extension 278, causing both arm 260 and 262 to roll about their longitudinal axis in their respective spherical bearings 266. Since both arms 260 and 262 are pivoted in one direction only on scraper blade 60, the scraper blade 60 is forced to tilt according to the alignment of both pivot supports 270. Likewise, when the rod 282 of hydraulic cylinder 280 is extended, the scraper blade 60 is forced to follow an opposite inclination of both lateral extension 276 and 278.

Thus a single cylinder is advantageously used to tilt the support arms 260 and 262 and to change the transversal inclination of scraper blade 60. This particular arrangement is characterized by very few moving part, and a compact support structure which is as a whole less expensive and simpler to manufacture than other previously available equipment for similar usage.

The preferred mounting structure for the scraper blade 60 of the articulated vehicle of the preferred embodiment is advantageously used in combination with the articulated joint 62 of the preferred embodiment to provide an articulated vehicle which is compact, flexible, tractably performant, and easily maneuverable during snow grooming operations.

This description of the invention as a track-type articulated vehicle having an articulated joint comprising three axes of movement and two resilient torsional couplings shall not constitute a limitation in the scope of its application. Also it shall not constitute a limitation in the possible configuration of its elements. Other all-terrain vehicles, with wheels for examples may benefit from the articulations thus described, with or without modifications.

Therefore, the preferred embodiment of the present invention as described herein is not limited thereto, and it will be apparent to those skilled in the art that numerous modifications form part of the present invention insofar as they do not depart from the spirit, nature and scope of the described and claimed invention.

I claim:

1. An articulated vehicle comprising:

a first vehicle body including a first body frame having a first longitudinal axis, and having ground-engaging means on a first side and on a second side of said first body frame, a second vehicle body including a second body frame having a second longitudinal axis, and having ground-engaging means on a first side and on a second side of said second body frame, an articulated joint connecting said first body frame to said second body frame, for allowing relative lateral oscillation of said first vehicle body about said first longitudinal axis, and for allowing lateral oscillation of said second vehicle body about said second longitudinal axis, said articulated joint further allowing relative pivotal movement of said first vehicle body and said second vehicle body about a steering axis perpendicular to said first and to said second longitudinal axes, said articulated joint comprising;

a first articulation member and a first shaft means mounting said first articulation member on said first body frame for relative oscillation of said first articulation member and of said first vehicle body about said first longitudinal axis, a second articulation member and a second shaft means mounting said second articulation member on said second body frame for relative oscillation of said second articulation member and of said second vehicle body about said second longitudinal axis, pivot means pivotally joining said first and second articulation members together along said steering axis, and allowing said pivotal movement of said first and second vehicle body while a first movement of said first body frame remains substantially co-planar with a second movement of said second body frame, and a first restrictively flexible torsion coupling means connected between said first articulation member and said first body frame for flexibly restraining said relative oscillation of said first articulation member and of said first vehicle body about said first longitudinal axis.

2. An articulated vehicle as claimed in claim 1, further comprising:

a second restrictively flexible torsion coupling means connected between said second articulation member and said second body frame for flexibly restraining said relative oscillation of said second articulation member and of said second vehicle body and about said second longitudinal axis.

3. An articulated vehicle as claimed in claim 1, wherein said restrictively flexible torsion coupling means comprises;

a core member mounted axially on said first longitudinal axis and affixed to said first articulation member, a casing member mounted rigidly on said first body frame, and a resilient material joining said core member and said casing member for allowing relative restrictively flexible angular movement therebetween.

4. An articulated vehicle as claimed in claim 1, wherein each of said ground-engaging means is an endless crawler track driven by an hydraulic motor, said articulated vehicle further comprising;

an engine and an hydraulic power supply means, piping means for connecting said hydraulic power supply means to said hydraulic motors, and hydraulic control means for controlling said hydraulic motors.

5. An articulated vehicle as claimed in claim 4 wherein;

said tracks on said first and second side of said first vehicle body are pivotally connected on and about a first axle transversally attached to said first body frame, and wherein said tracks on said first and second side of said second vehicle body are pivotally connected on and about a second axle transversally attached to said second body frame.

6. An articulated vehicle as claimed in claim 1 wherein;

said first shaft means mounting said first articulation member on said first body frame comprises a first shaft having a first end and a second end spaced about said articulation member, said first shaft being held in said first body frame by means of a first bushing on said first end and of a second bushing on a said second end.

7. An articulated vehicle as claimed in claim 3 wherein;

said core member of said restrictively flexible torsion coupling means is affixed to said first articulation member by means of a plurality of dowel pins having substantially equal engagement lengths into said first articulation member and into said core member.

8. An articulated vehicle as claimed in claim 7 wherein;

said first shaft means mounting said first articulation member on said first body frame comprises a thrust plate between said casing member and said first body frame, and wherein a thickness of said thrust plate is more than said length of engagement of said dowel pins into said core member.

9. An articulated vehicle as claimed in claim 3 wherein said resilient material is a vulcanized rubber, and wherein said relative restrictively flexible angular movement therebetween is about 30°.

10. An articulated vehicle as claimed in claim wherein;

said articulated vehicle comprises hydraulic power supply and control means, said relative pivotal movement of said first vehicle body and said second vehicle body about said steering axis is effected by hydraulic cylinder means connected on a first end thereof to said first articulated member and on a second end thereof to said second articulation member, at a location on said second articulation member which is radially distant from said steering axis.

11. An articulated vehicle as claimed in claim 2 wherein;

said relative pivotal movement of said first vehicle body and said second vehicle body about a steering axis is about 25°, said lateral oscillation of said first vehicle body about said first longitudinal axis is about 30°, and said lateral oscillation of said second vehicle body about said second longitudinal axis is also about 30°.

12. An articulated vehicle as claimed in claim 2, wherein each of said ground-engaging means is an endless cleated crawler track driven by an hydraulic motor, said articulated vehicle further comprising;

an engine and an hydraulic power supply means, piping means for connecting said hydraulic power supply means to said hydraulic motors, hydraulic control means for controlling said hydraulic motors, a first axle transversally attached to said first body frame for pivotally connecting said first and second tracks on said first vehicle body to and about a first and second end thereof, and a second axle transversally attached to said second body frame for pivotally connecting said first and second tracks on said second vehicle body to and about a first and second end thereof.

13. An articulated joint for interconnecting a first and second units to define an articulated vehicle, which comprises;

a first articulation member rotatively mounted on a first shaft, said first shaft being detachably mounted on said first unit and along a longitudinal axis thereof, for allowing a first relative oscillation of said first unit and of said first articulation member about said first longitudinal axis, a second articulation member rotatively mounted on a second shaft, said second shaft being detachably mounted on said second unit along a second longitudinal axis thereof, for allowing a second relative oscillation of said second unit and of said second articulation member about said second longitudinal axis, a first and second spaced apart steer pivots connecting said first articulation member and said second articulation member in a pivotal manner about and along a steering axis, for allowing relative pivotal movement of said first unit and of said second unit about said steering axis, a first restrictively flexible torsion coupling means connected between said first articulation member and said first unit for flexibly restraining said first relative oscillation of said first articulation member and of said first unit about said first longitudinal axis.

14. An articulated joint as claimed in claim 13, further comprising;

a second restrictively flexible torsion coupling means connected between said second articulation member and said second unit for flexibly restraining a relative oscillation of said second articulation member and of said second unit about said second longitudinal axis.

15. An articulated joint as claimed in claim 13, wherein said first restrictively flexible torsion coupling means comprises;

a core member mounted axially on said first shaft and affixed to said first articulation member, a casing member mounted rigidly on a frame portion of said first unit, and a resilient material joining said core member and said casing member for allowing relative restrictively flexible angular movement therebetween.

16. An articulated joint as claimed in claim 15 wherein;

said core member of said first restrictively flexible torsion coupling means is affixed to said first articulation member by means of a plurality of dowel pins having substantially equal engagement lengths into said first articulation member and into said core member.

17. An articulated joint as claimed in claim 16 wherein;

said first restrictively flexible torsion coupling means comprises a thrust plate adjacent said casing member, and wherein a thickness of said thrust plate is more than said length of engagement of said dowel pins into said core member.

18. An articulated joint as claimed in claim 15 wherein said resilient material is vulcanized rubber, and wherein said relative restrictively flexible angular movement therebetween is about 30°.

19. An articulated joint as claimed in claim 13 wherein said relative pivotal movement of said first unit and of said second unit about said steering axis is effected by;

linear actuator means connected on a first end thereof to said first articulated member and on a second end thereof to said second articulation member, at a location on said second articulation member which is radially distant from said steering axis.

20. In combination, an articulated vehicle and a scraper blade mounted on a front portion thereof for levelling irregular snow surfaces, said articulated vehicle comprising;

a front vehicle body including a front body frame having a first longitudinal axis, and having hydraulically driven endless crawler tracks on a first and second side of said first body frame, a rear vehicle body including a rear body frame having a second longitudinal axis, and also having hydraulically driven endless crawler tracks on a first and second side of said rear body frame, an engine and an hydraulic power supply and control means, an articulated joint connecting said front body frame to said rear body frame, for allowing relative lateral oscillation of said front vehicle body about said first longitudinal axis, and for allowing lateral oscillation of said rear vehicle body about said second longitudinal axis, said articulated joint further allowing relative pivotal movement of said front vehicle body and said rear vehicle body about a steering axis perpendicular to said first and to said second longitudinal axes, said articulated joint comprising;

a first articulation member and a first shaft means mounting said first articulation member on said front body frame for relative oscillation of said first articulation member and of said front vehicle body about said first longitudinal axis, a second articulation member and a second shaft means mounting said second articulation member on said rear body frame for relative oscillation of said second articulation member and of said rear vehicle body about said second longitudinal axis, pivot means pivotally joining said first and second articulation members together along said steering axis, and allowing said pivotal movement of said front and rear vehicle bodies while a first movement of said front body frame remain substantially co-planar with a second movement of said rear body frame, a first restrictively flexible torsion coupling means connected between said first articulation member and said front body frame for flexibly restraining said relative oscillation of said first articulation member and of said front vehicle body about said first longitudinal axis, a first hydraulic cylinder means connected on a first end thereof to said first articulated member and on a second end thereof to said second articulation member, at a location on said second articulation member which is radially distant from said steer axis, for effecting said relative pivotal movement of said front vehicle body and said rear vehicle body about said steering axis, said scraper blade having an articulation mechanism connected to said front body frame, said articulation mechanism comprising;

a first arm having a first longitudinal axis, and being connected at a first end to a first clevis on said front body frame by means of a first spherical bearing, and at a second end to said scraper blade by means of a first uniaxial pivot, a second arm having a second longitudinal axis, and being connected at a first end to a second clevis on said front body frame by means of a second spherical bearing, and at second end to said scraper blade by means of a second uniaxial pivot, said first arm and said second arm being spaced apart and parallel to one-another, said first and second uniaxial pivots being mounted on said scraper blade in a co-axial relationship to one-another, said first arm having a lateral extension pointing toward said second arm, and said second arm having a second lateral extension pointing toward said first arm, said first lateral extension and said second lateral extension being overlapping at a distance from one-another, a second hydraulic cylinder means having a casing mounted on said first lateral extension, and a cylinder rod resiliently attached to said second lateral extension, wherein an extension and retraction of said cylinder rod from a supply of hydraulic power from said hydraulic power supply means causes said first and second arms to tilt in a common direction about said first and second longitudinal axes respectively, and causes said scraper blade to incline according to an alignment of said first and second uniaxial pivots.

* * * * *